July 19, 1932.                C. W. HANSELL                1,867,567
              DETECTION OF FREQUENCY MODULATED SIGNALS
                         Filed Feb. 1, 1929
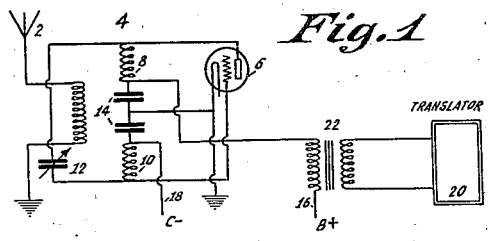
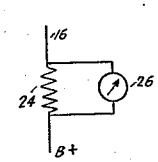
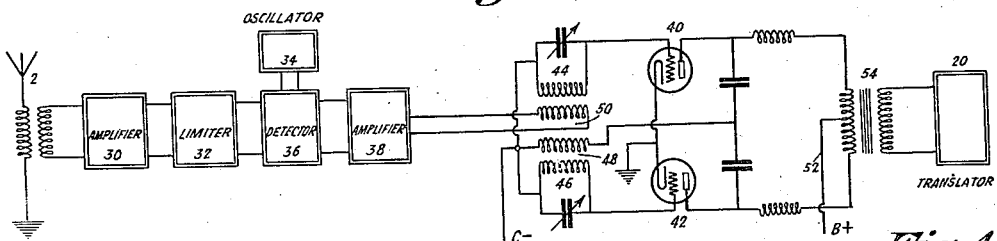
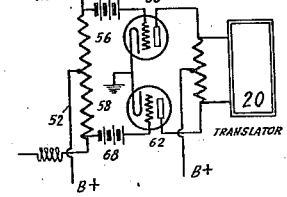
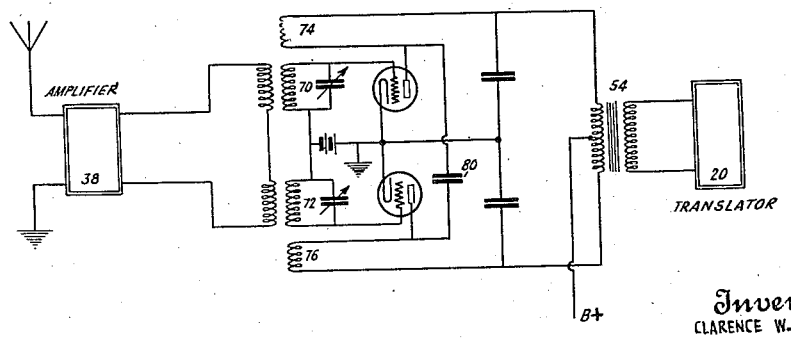
Inventor
CLARENCE W. HANSELL
By his Attorney Patented July 19, 1932

1,867,567

UNITED STATES PATENT OFFICE

CLARENCE W. HANSELL, OF PORT JEFFERSON, NEW YORK, ASSIGNOR TO RADIO CORPORATION OF AMERICA, A CORPORATION OF DELAWARE

DETECTION OF FREQUENCY MODULATED SIGNALS

Application filed February 1, 1929. Serial No. 336,772.

This invention relates to a method and means for securing a response dependent upon the frequency of alternating electrical energy, and more particularly to a method and means for detecting frequency modulated signals.

The primary object of my invention is to provide a method and means for securing a frequency indication, and to this end I convert direct energy to alternating energy in an electron emission tube oscillator tuned to a frequency different from that to be measured, and I apply the alternating energy, the frequency of which is to be measured, to the oscillator in order to force the latter to oscillate at the impressed frequency. I then utilize the magnitude of the direct energy supplied to the oscillator as an indication of the frequency of the alternating energy, for the efficiency of the oscillator varies greatly in accordance with the departure of the oscillation frequency from the resonant frequency, and the consumption of direct energy varies in a similar manner. The arrangement is especially suitable for detecting rapid changes in frequency, the consequent changes in magnitude of the direct energy supplied to the oscillator being a measure of the changes in frequency of the alternating electrical energy which is applied to the oscillator.

In order to detect frequency modulated signals it has heretofore been proposed to first change the frequency modulation to amplitude modulation by impressing the received signals on a resonant circuit tuned to a frequency lying outside the operating range of frequency, and thereafter to detect the resulting amplitude modulated signals in order to obtain signal frequency energy for use in a translating device. Such a method is difficult to free from distortion, and is limited in usefulness by the fact that the resonance characteristic of a tuned circuit may differ under dynamic conditions, such as exist when the frequency of the energy applied thereto is rapidly varying, from what it is under static conditions, when each frequency applied thereto is kept constant for a considerable period of time.

It is a further object of my invention to provide a frequency modulation detector which is sensitive and free from distortion. The method of my invention includes converting direct energy to alternating energy in an electron emission tube oscillator tuned to a frequency lying outside the range of frequency modulation, applying the frequency modulated energy to the local oscillator in order to force the latter to similarly vary in frequency, and utilizing the consequent variations in the direct energy supplied to the oscillator for translation.

Frequency modulated energy, ideally, possesses no amplitude variation, and this condition is desirable for correct operation of my arrangement, last the consumption of direct energy vary with variations in the strength of the received signal. Close limiting is not essential, but there must be sufficient limiting so that the signal energy will maintain control over the frequency of oscillation of the oscillator. To meet the desired condition I propose to limit the amplitude of the frequency modulated energy before applying it to the oscillator, thereby eliminating changes in amplitude caused by fading and other transmision phenomena.

The degree of variation of the direct energy is enhanced if the percentage frequency modulation is increased, and according to my invention the relatively slight modulation of the received carrier is increased by heterodyning the received energy with locally generated energy of constant frequency. The resulting beat energy has a variation in frequency equal to that of the received carrier, but the modulation being impressed on a lower carrier, the percentage modulation is greatly increased.

In order to obtain symmetrical operation and so further reduce the possibility of distortion I propose to use two local oscillators, one tuned to a frequency lying outside one extreme of the working frequency range, and the other tuned to a frequency lying outside the other extreme of the working frequency range. The received energy is applied to both of the oscillators, while the translating device is coupled in series with the anodes of the oscillator tubes, with respect to the direct energy, so that it is made responsive to the differential of the anode currents.

In order to insure that the oscillators both follow the received energy in frequency I prefer to couple the oscillators together, so that they are forced to oscillate at a common compromise frequency lying intermediate the resonance frequencies, and I use the frequency modulated energy to force the said common frequency to vary with the frequency modulation.

My invention is further described in the following specification, which is accompanied by a drawing in which Figure 1 represents a simple form of frequency modulation receiver; Figure 2 is a modified fragment of Figure 1 showing a different indicating device; Figure 3 is a frequency modulation receiver with inductively coupled oscillators; Figure 4 is a modified fragment of Figure 3 showing an alternative coupling arrangement between the oscillator and translating device; and Figure 5 is a symmetrical detector having two oscillators coupled together by a condenser.

Referring to Figure 1, there is a source of received alternating electrical energy, here exemplified by an antenna system 2, which is coupled to a local oscillator 4. The oscillator comprises an electron emission tube 6, the electrodes of which are regeneratively coupled by the inductances 8 and 10, and these together with a condenser 12 form a resonant circuit which is tuned to a frequency different from that being received. Blocking condensers 14 are used to separate the direct anode and control electrode potentials, which are supplied through leads 16 and 18, respectively. For the reception of frequency modulated signals a translating device 20 is coupled through a transformer 22 with the direct anode current supply lead 16. The operation of the arrangement shown is very simple, the received energy forcing the oscillator to oscillate at the received frequencies, which, being different from the natural frequency to which the oscillator is tuned, cause changes in the efficiency of the oscillator, and consequently in its consumption of direct energy. These fluctuations are conveyed to a translating device of any type appropriate to the kind of signal being transmitted, such as a loud speaker, a tape recorder, a facsimile or picture recorder, and so on.

In its broadest aspect my invention provides a novel method of measuring frequency, and an arrangement for this is indicated in Figure 2, in which the direct energy lead 16 includes a fixed resistance 24, across which a voltmeter 26 is connected, the reading of which is proportional to the flow of direct energy, and consequently, is dependent upon the frequency of the energy applied to the oscillator. An ammeter or other instrument may equally well be inserted in the direct energy lead.

In the arrangement shown in Figure 3 there is an antenna system 2, the energy collected by which is applied to an amplifier 30, which is itself made to act as, or which is followed by, a limiter 32. The received energy is preferably reduced in frequency, in order to increase the percentage frequency modulation, by heterodyning it with energy from a local oscillator 34 in a heterodyne detector 36. The limiter 32 may be located after the detector 36 as well as ahead of it, and, of course, a further stage of amplification 38 may be provided, which itself may be made to act as a limiter.

The oscillator in this case comprises two electron emission tubes, 40 and 42, having resonant input circuits 44 and 46, respectively. One of these is tuned to a frequency lying outside one extreme of the applied frequency range, while the other is tuned to a frequency lying outside the other extreme of the applied frequency range. The circuits 44 and 46 are coupled together and to a common anode coil 48. The coupling between the circuit 44 and the coil 48 provides the necessary regeneration to make an oscillator of the tube 40, while the coupling between the circuit 46 and the coil 48 provides the necessary regeneration to make an oscillator of the tube 42. However, the coupling between circuits 44, 46, and 48 makes the entire oscillator oscillate at a common frequency which is a compromise or floating frequency intermediate the resonant frequencies of the oscillators.

The oscillators are not only coupled together but also are coupled by a coil 50 to the output circuit of the amplifier 38, so that the common frequency follows the frequency of the applied energy.

The direct energy for the oscillators is fed from a lead 52, preferably to the mid point of a transformer 54, arranged in series between the anodes of the tubes 40 and 42. A translating device 20 is coupled to the secondary of the transformer. With this arrangement a variation in the received frequency increases the efficiency of one of the oscillators at the same time that it decreases the efficiency of the other of the oscillators, and thereby causes an effective pushpull operation, with respect to the direct energy, the translating device 20 being responsive to the differential of the anode currents of the two oscillators.

Instead of a transformer coupling for the translating device a resistance coupled system may be used, as in the case of spacing wave code signalling. This is indicated in Figure 4, in which the direct energy is fed from a lead 52 to the mid point of coupling resistances 56, 58. The potential variations across the resistances are applied to the control electrodes of amplifier tubes 60 and 62, the output circuits of which may be coupled through a resistance 64 to a translating or recording device 20. The control electrodes of the tubes 60 and 62 are suitably biased by batteries 66 and 68.

It is not essential that the oscillators be combined into a single oscillator of floating frequency, though I consider that to be the most sensitive form, for separated oscillators may be used. Such an arrangement is shown in Figure 5, assuming the condenser 80 to be omitted. This detector circuit is quite similar to the arrangement shown in Figure 3 except that the resonant circuits 70 and 72, while regeneratively coupled with their respective anode circuits by coils 74 and 76, are not inductively coupled together, and may oscillate independently. Received energy is applied from the amplifier 38 to the oscillators, which are thereby forced to vary in frequency. As before, the differential of the direct energy supplied to the oscillators is fed through a transformer 54 to a translating device 20. By connecting a condenser of relatively large capacitance, 80, directly across the anodes of the tubes, the oscillators may be forced to oscillate together, thereby making the arrangement function like that described in Figure 3.

It will be understood that any suitable type of oscillator may be employed, several characteristic oscillator circuits being indicated in the wiring diagrams disclosed. Also, any of the amplifiers may be used as limiters, instead of employing separate limiters, and autodyne heterodyne detection may be utilized instead of a separated local oscillator and detector. By appropriately rewiring the circuit, the arrangement shown in Figure 3 may be altered so that the oscillators are coupled in pushpull, with respect to the radio frequency, instead of in parallel, as shown. The oscillators then will operate at like frequencies, but in phase opposition.

I claim:

1. The method of securing a response dependent upon the frequency of alternating electrical energy which includes locally converting direct energy to alternating energy in an oscillator adjusted to a fixed frequency, applying the alternating energy to the oscillator in order to vary the oscillation frequency, and securing a response in accordance with the magnitude of the direct energy supplied to the oscillator as an indication of the frequency of the alternating energy.

2. The method of detecting changes in the frequency of received alternating electrical energy which includes locally converting direct energy to alternating energy in an oscillator adjusted to a frequency lying outside the range of frequency of the received energy, applying the received energy to the oscillator in order to vary the oscillation frequency, and securing a response in accordance with the changes in magnitude of the direct energy supplied to the oscillator as an indication of variation in the received frequency.

3. The method of detecting frequency modulated signals which includes locally converting direct energy to alternating energy in an oscillator adjusted to a frequency lying outside the range of frequency modulation, applying the frequency modulated energy to the local oscillator in order to force the latter to similarly vary in frequency, and utilizing the consequent variations in the direct energy for translation.

4. The method of receiving frequency modulated signals which includes converting direct energy to alternating energy in an oscillator adjusted to a frequency lying outside the range of frequency modulation, limiting the amplitude of the frequency modulated energy, applying the limited energy to the oscillator in order to force the latter to similarly vary in frequency, and utilizing the consequent variations in the direct energy for translation.

5. The method of receiving frequency modulated signals which includes reducing the frequency and limiting the amplitude of the frequency modulated energy, converting direct energy to alternating energy in an oscillator adjusted to a frequency lying outside the frequency range of the resulting energy, applying the resulting energy to the oscillator in order to force the latter to similarly vary in frequency, and utilizing the consequent variations in the direct energy for translation.

6. The method of detecting frequency modulated signals which includes converting direct energy to alternating energy in an oscillator adjusted to a frequency lying outside one extreme of the working frequency range, simultaneously converting direct energy to alternating energy in an oscillator adjusted to a frequency lying outside the other extreme of the working frequency range, applying the frequency modulated energy to the oscillators in order to force them to similarly vary in frequency, and utilizing the differential of the direct energies for translation.

7. The method of detecting frequency modulated signals which includes converting direct energy to alternating energy in an oscillator adjusted to a frequency lying outside one extreme of the working frequency range, simultaneously converting direct energy to alternating energy in an oscillator adjusted to a frequency lying outside the other extreme of the working frequency range, forcing the oscillators to oscillate at a common frequency intermediate their natural adjusted frequencies, applying the frequency modulated energy to the oscillators in order to force their common frequency to vary with the frequency modulation, and utilizing the differential of the direct energies for translation.

8. The method of receiving frequency modulated signals which includes reducing the frequency and limiting the amplitude of the frequency modulated energy, converting direct energy to alternating energy in an oscillator tuned to a frequency lying outside one extreme of the frequency range of the resulting energy, simultaneously converting direct energy to alternating energy in an oscillator tuned to a frequency lying outside the other extreme of the frequency range of the resulting energy, forcing the oscillators to oscillate at a common frequency intermediate their resonant frequencies, applying the resulting energy to the oscillators in order to force their common frequency to similarly vary in frequency, and utilizing the differential of the direct energies for translation.

9. An arrangement for detecting changes in the frequency of received alternating electrical energy comprising an electron emission tube oscillator tuned to a frequency lying outside the range of frequency of the received energy for converting direct energy to alternating energy, means to apply the received energy to the oscillator in order to vary the oscillation frequency, and means responsive to changes in magnitude of the direct energy for indicating variations in the received frequency.

10. An arrangement for detecting frequency modulated signals comprising an electron emission tube oscillator tuned to a frequency lying outside the range of frequency modulation for converting direct energy to alternating energy, means to apply the frequency modulated energy to the local oscillator in order to force the latter to similarly vary in frequency, and a translating device responsive to the consequent variations in the direct energy.

11. A frequency modulation receiver comprising an electron emission tube oscillator tuned to a frequency lying outside the range of frequency modulation for converting direct energy to alternating energy, means to limit the amplitude of the frequency modulated energy, means to apply the limited energy to the oscillator in order to force the latter to similarly vary in frequency, and a translating device responsive to the consequent variations in the direct energy.

12. A frequency modulation receiver comprising means to reduce the frequency and to limit the amplitude of the frequency modulated energy, an electron emission tube oscillator tuned to a frequency lying outside the frequency range of the resulting energy for converting direct energy to alternating energy, means to apply the resulting energy to the oscillator in order to force the latter to similarly vary in frequency, and a translating device responsive to the consequent variations in the direct energy.

13. An arrangement for detecting frequency modulated signals comprising an electron emission tube oscillator tuned to a frequency lying outside one extreme of the working frequency range for converting direct energy to alternating energy, a second electron emission tube oscillator tuned to a frequency lying outside the other extreme of the working frequency range for converting direct energy to alternating energy, means to apply the frequency modulated energy to the oscillators in order to force them to similarly vary in frequency, and a translating device responsive to the differential of the direct energies.

14. An arrangement for detecting frequency modulated signals comprising an electron emission tube oscillator tuned to a frequency lying outside of one extreme of the working frequency range for converting direct energy to alternating energy, an electron emission tube oscillator tuned to a frequency lying outside the other extreme of the working frequency range for converting direct energy to alternating energy, means coupling said oscillators together in order to force them to oscillate at a common frequency intermediate their resonant frequencies, means to apply the frequency modulated energy to the oscillators in order to force their common frequency to vary with the frequency modulation, and a translating device responsive to the differential of the direct energies.

15. A frequency modulation receiver comprising means to reduce the frequency and limit the amplitude of the frequency modulated energy, an electron emission tube oscillator tuned to a frequency lying outside one extreme of the frequency range of the resulting energy for converting direct energy to alternating energy, an electron emission tube oscillator tuned to a frequency lying outside the other extreme of the frequency range of the resulting energy for converting direct energy to alternating energy, means coupling the oscillators together to force them to oscillate at a common frequency intermediate their resonant frequencies, means to apply the resulting energy to the oscillators in order to force their common frequency to vary with the frequency modulation, and a translating device responsive to the differential of the direct energies.

CLARENCE W. HANSELL.